United States Patent [19]
Gentry, Jr.

[11] Patent Number: 6,021,446
[45] Date of Patent: Feb. 1, 2000

[54] NETWORK DEVICE DRIVER PERFORMING INITIAL PACKET PROCESSING WITHIN HIGH PRIORITY HARDWARE INTERRUPT SERVICE ROUTINE AND THEN FINISHING PROCESSING WITHIN LOW PRIORITY SOFTWARE INTERRUPT SERVICE ROUTINE

[75] Inventor: Denton E. Gentry, Jr., Fremont, Calif.

[73] Assignee: Sun Microsystems, Inc., Mountain View, Calif.

[21] Appl. No.: 08/893,862

[22] Filed: Jul. 11, 1997

[51] Int. Cl.[7] .................................................. G06F 13/00
[52] U.S. Cl. .......................... 709/303; 709/250; 710/264
[58] Field of Search ...................... 395/200.8, 868–870, 395/681, 736–738; 709/250, 303; 710/263–265, 48–50

[56] References Cited

U.S. PATENT DOCUMENTS

| | | | |
|---|---|---|---|
| 4,980,820 | 12/1990 | Youngblood | 395/826 |
| 5,410,715 | 4/1995 | Ishimoto et al. | 710/264 |
| 5,465,364 | 11/1995 | Lathrop et al. | 395/681 |
| 5,515,538 | 5/1996 | Kleiman | 710/260 |
| 5,606,559 | 2/1997 | Badger et al. | 370/395 |
| 5,630,141 | 5/1997 | Ross et al. | 395/734 |
| 5,644,772 | 7/1997 | Mann | 710/260 |
| 5,675,829 | 10/1997 | Oskouy et al. | 710/6 |
| 5,680,624 | 10/1997 | Ross | 395/734 |
| 5,721,920 | 2/1998 | Mak et al. | 395/672 |
| 5,732,082 | 3/1998 | Wartski et al. | 370/395 |
| 5,740,448 | 4/1998 | Gentry et al. | 710/200 |
| 5,778,180 | 7/1998 | Gentry et al. | 709/212 |
| 5,793,747 | 8/1998 | Kline | 370/230 |
| 5,818,845 | 10/1998 | Burwell et al. | 370/397 |
| 5,832,222 | 11/1998 | Dziadosz et al. | 709/216 |
| 5,848,293 | 12/1998 | Gentry | 710/5 |
| 5,875,341 | 2/1999 | Blank et al. | 710/260 |
| 5,875,352 | 2/1999 | Gentry et al. | 710/23 |
| 5,881,296 | 3/1999 | Williams et al. | 710/263 |
| 5,894,480 | 4/1999 | Hoffert et al. | 370/389 |
| 5,903,752 | 5/1999 | Dingwall et al. | 709/103 |

OTHER PUBLICATIONS

Smith, J., et al., Giving Applications Access to Gb/s Networking, IEEE Network, vol. 7, No. 4, pp. 44–52, Jul. 1993.

Walker, W., et al., "Interrupt Processing in Concurrent Processors," IEEE Computer, vol. 28, No. 6, pp. 36–46, Jun. 1995.

Dittia, Z., et al., "The APIC Approach to High Performance Network Interface Design: Protected DMA and Other Techniques," Proceedings of INFOCOM '97, IEEE, vol. 2, pp. 823–83,1 Apr. 1997.

Zuccarelli, T., et al., "Test and Evaluation of the SVID–Compliant Real/IX Realtime Operating System," Proceedings of Southeastcon '90, IEEE, vol. 1, pp. 81–85, Apr. 1990.

Brustoloni, J., et al., "Evaluation of Data Passing and Scheduling Avoidance," Proceedings of the IEEE 7th Int'l. Workshop on Network and Operating System Support for Digital Audio and Video, IEEE, pp. 95–105, May 1997.

Zeadally, S., "A UNIX–based ATM Multimedia Architecture," Proc. of the 2nd IEEE Symp. on Computers and Communications, pp. 131–138, Jul. 1997.

*Primary Examiner*—Zarni Maung
*Assistant Examiner*—Andrew Caldwell
*Attorney, Agent, or Firm*—Blakely Sokoloff Taylor & Zafman

[57] ABSTRACT

A network device such as an Asynchronous Transfer Method (ATM) device with a high level interrupt which begins processing a packet and transfers process control to a lower level software interrupt which completes the packet processing. Prior to the transfer of process control, the hardware interrupt generates a put information for the packet which is then retrieved and utilized by the software interrupt to process the packet. A unique generation number is assigned to each data stream generated for the packet. The generation number associated with a given packet's put information is compared to the generation number of a data stream to which the packet is destined to. If the generation numbers are equal, it is assumed that the data stream to which the packet is destined to has not been changed and the packet is forwarded to the data stream for further processing.

18 Claims, 9 Drawing Sheets

NETWORK DEVICE DRIVER PERFORMING INITIAL PACKET PROCESSING WITHIN HIGH PRIORITY HARDWARE INTERRUPT SERVICE ROUTINE AND THEN FINISHING PROCESSING WITHIN LOW PRIORITY SOFTWARE INTERRUPT SERVICE ROUTINE

BACKGROUND OF THE INVENTION

(1) Field of the Invention

The present invention is related to the field of device drivers for networking devices, more specifically, the present invention is a method and an apparatus for reducing interrupt overhead in networking device drivers.

(2) Related Art

Computer systems capable of transmitting and receiving data through a network typically have network hardware interrupts to support network data transmission and reception. Traditionally, network hardware interrupts have higher priority than most other hardware interrupts.

While a device driver activated by a given hardware interrupt is occupied in processing data on a computer system, no other device drivers having an interrupt level below the running device driver may begin its execution. Some hardware devices such as an Asynchronous Transfer Method (ATM) device may cause a plurality of hardware interrupts in a very short period of time. The plurality of hardware interrupts may allow a device driver associated with the ATM device to monopolize central processing unit (CPU) time. Such monopolization may adversely affect normal processing of the computer system due to delayed processing of lower level interrupt requests. An exemplary time line illustrating a hardware interrupt being delayed by excessive processing of a previous hardware interrupt is illustrated in FIG. 1.

FIG. 1 illustrates a timing diagram with an ATM device and an Ethernet device both causing hardware interrupts. While a computer system is executing on time a line 100 at time A, an ATM device 102 asserts a hardware interrupt which is serviced. While the hardware interrupt handler is de-queuing packets off of the ATM device 102, an Ethernet 104 asserts a hardware interrupt at time B. However, because the hardware interrupt asserted by the ATM 102 is already accepted, the Ethernet 104's request to initiate a hardware interrupt is denied. At time C, the ATM 102's hardware interrupt has completed de-queuing packets off of the ATM device 102 and the process time is freed up. The Ethernet 104's hardware interrupt may finally begin processing.

To compound the problem of undue delay of low level processing, ATM devices perform all of their processing within a CPU's interrupt context. FIG. 2 illustrates an exemplary task initiated by a single hardware interrupt caused by an ATM device. Once a packet arrives on the ATM device, an interrupt is asserted by the ATM device and an ATM device driver 110 de-queues packets off the ATM device and determines that the packet is an Internet Protocol (IP) packet. The packet is then transported to the IP layer 112 which determines that the packet is a Transport Control Protocol (TCP) packet. The packet is then forwarded to the TCP layer 114. The TCP layer 114 determines that the packet is a TCP layer 114 acknowledge packet (i.e. acknowledgment to the TCP that the packet which the TCP forwarded to the ATM device has been successfully transmitted to its destination.) The TCP layer 114 may then transmit a new packet and forwards a new packet to the IP layer 112. The IP layer 112 forwards the packet to the ATM device driver 110. The ATM device driver 110 transmits the packet to the ATM device.

As was illustrated in FIG. 2, device drivers for networking equipment such as an ATM device typically perform all of their processing within a CPU's interrupt context. While running a device driver associated with the ATM device, the CPU is prohibited from servicing lower level interrupt tasks resulting in reduced overall system performance. Thus, it is desirable to have a method and an apparatus for high level processing to be performed at a lower interrupt level to allow other interrupts to be serviced by the CPU.

BRIEF SUMMARY OF THE INVENTION

A method and an apparatus for reducing interrupt overhead in device drivers is disclosed. In the present invention, network device driver tasks executing on a computer system are performed at a lower interrupt level to allow interrupts of lower level processing to be serviced by the CPU.

More specifically, a device driver associated with an Asynchronous Transfer Method (ATM) network device is opened and data streams are generated. A data stream is typically a layer in kernel space through which data is transported to reach a user process. Kernel space is the part of an operating system that performs basic functions such as allocating hardware resources. A unique generation number is assigned to each data stream as it is generated. A hardware interrupt is asserted by the network device carrying a packet for the computer system. The generation number of the data stream to which the packet is destined is stored in a put information first-in first-out (FIFO) queue. Changes in the data streams generated for the packet which may have been made when the process control transferred from the hardware interrupt to the lower level software interrupt are monitored.

Because the processing involved with the ATM device is given over to a lower level software interrupt, interrupt requests by other devices may be serviced without undue delay. Additionally, the unique generation numbers assigned to each data stream prevents packets from being forwarded to data streams which are no longer applicable to the packet. The latter is especially advantageous in multi-processing systems having multiple processors modifying the same data streams such that data streams originally generated for a particular packet are modified and are no longer applicable to that packet.

DETAILED DESCRIPTION OF THE INVENTION

A method and an apparatus for reducing interrupt overhead in device drivers is disclosed. In the present invention, a low level software interrupt is triggered responsive to a high level hardware interrupt associated with a network device driver. The hardware interrupt is caused by a network device to process a packet. A unique generation number is assigned to each data stream generated for a packet and the generation number is stored in a put information first-in first-out (FIFO) queue. The low level software interrupt processes the packet by forwarding the packet to its destination data stream. A data stream is typically a layer in kernel space through which data is transported to reach a user process. Kernel space is the part of an operating system that performs basic functions such as allocating hardware resource.

By transferring process control from a hardware interrupt to a low level software interrupt, the present invention allows low level processing to take place despite the activation of the high level hardware interrupt. Additionally, unique generation numbers assigned to data streams prevent packets from being forwarded to modified and therefore inapplicable data streams.

Figure 1:
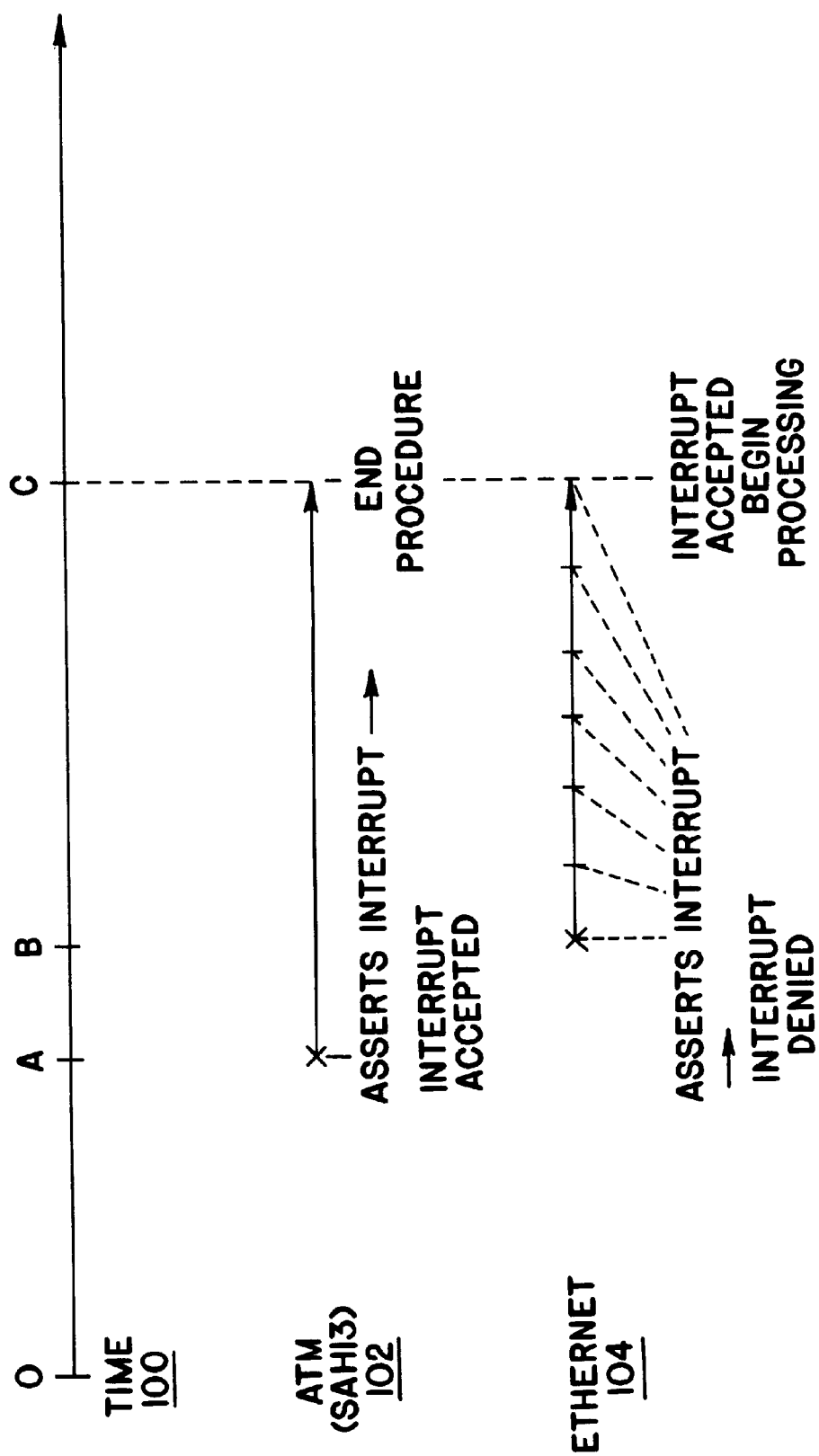
FIG. 1 illustrates a timing diagram with an Asynchronous Transfer Method (ATM) device and an Ethernet both causing hardware interrupts.
Figure 2:
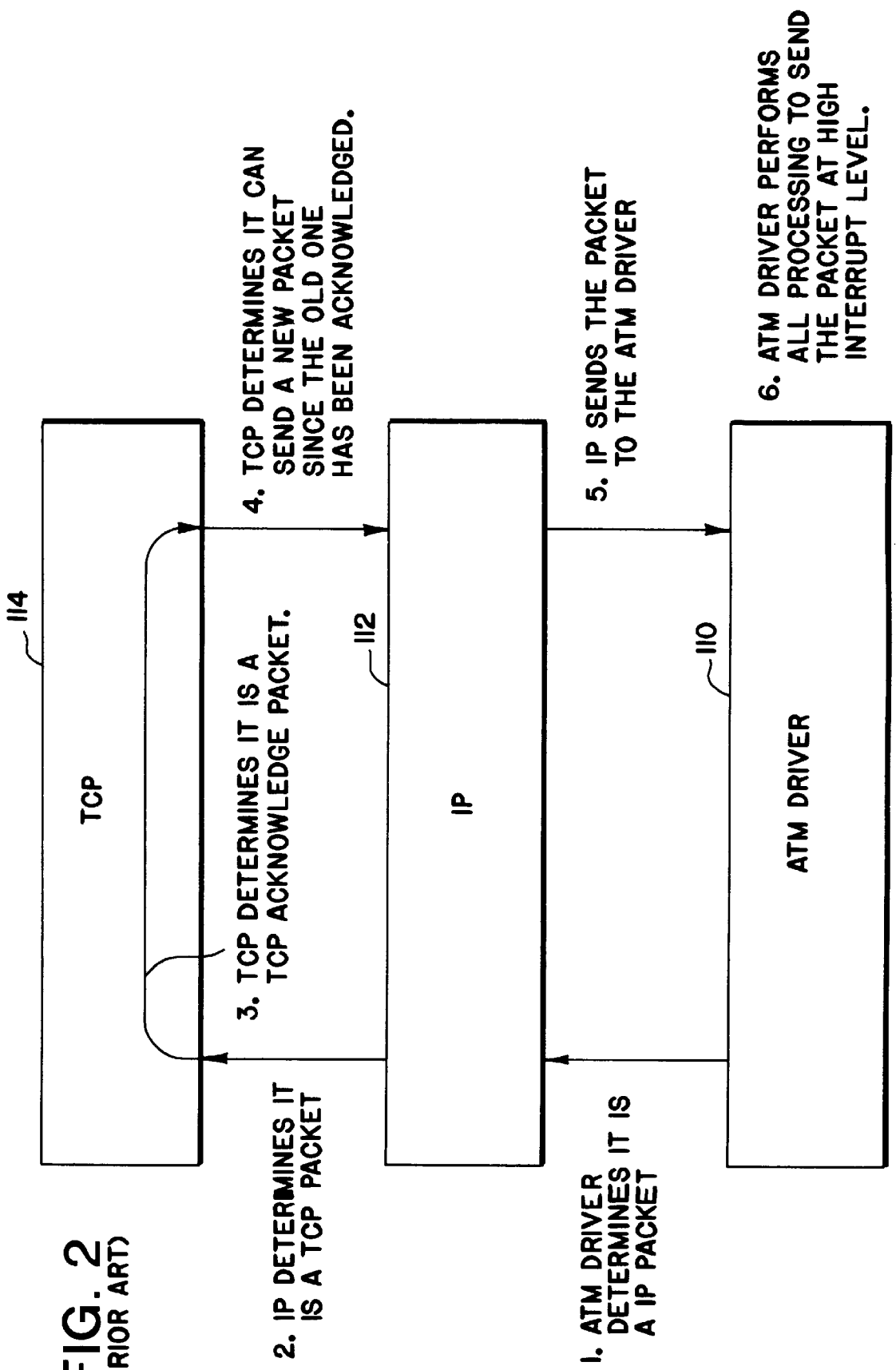
FIG. 2 illustrates tasks initiated by a single hardware interrupt by an ATM device.
Figure 3:
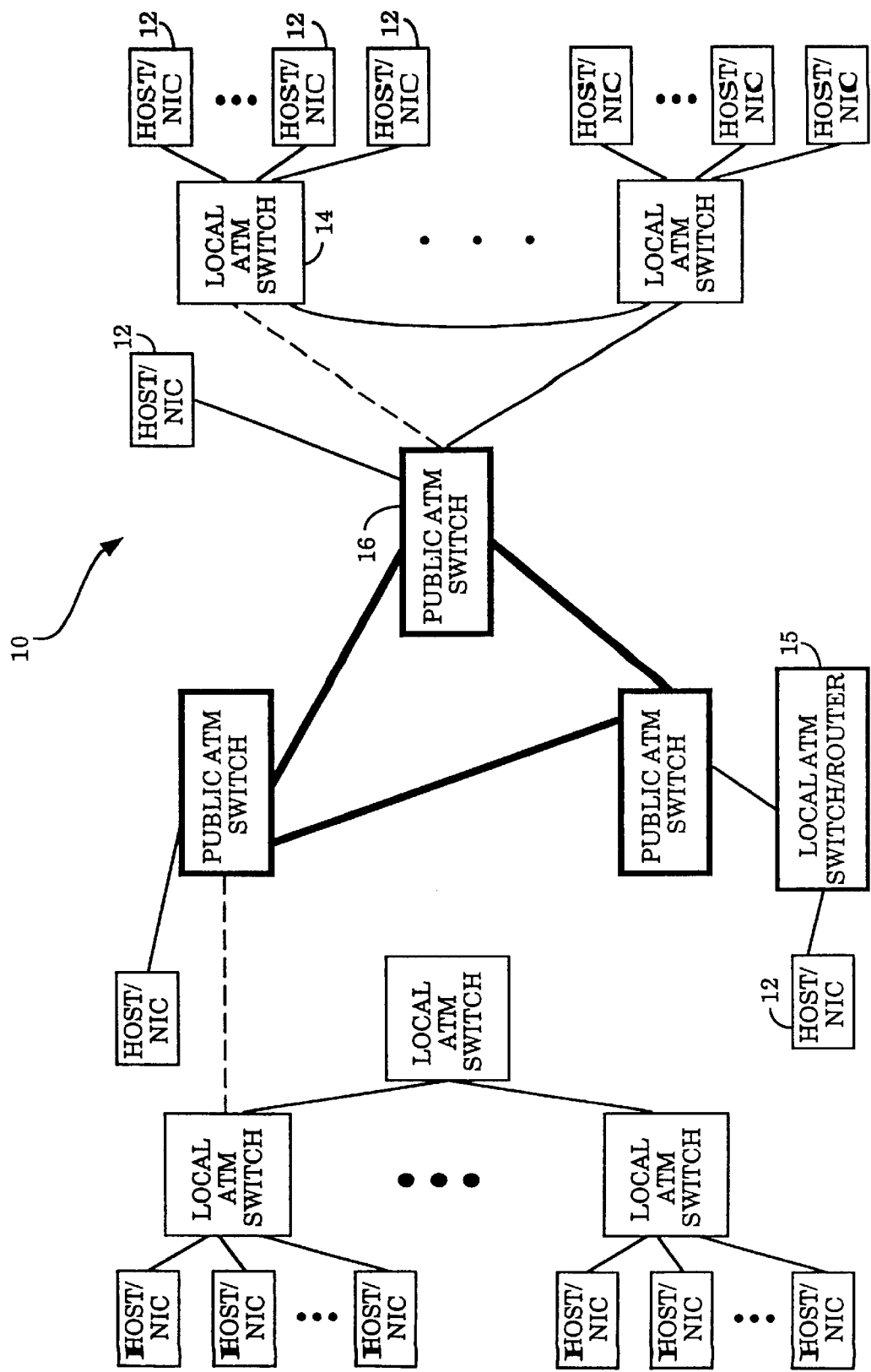
FIG. 3 illustrates an exemplary computer system network.

FIG. 3 illustrates an exemplary computer system network incorporating the Asynchronous Transfer Method (ATM) network interface circuit which utilizes the present invention's method and apparatus for reducing interrupt overhead in device drivers. The computer system network 10 includes host computer systems (not shown) which incorporate one or more of the ATM network interface circuits (NIC) 12. The NICs 12 are coupled through a local ATM switch 14 to a public ATM switch 16 to enable asynchronous transfer of data between host computer systems coupled to the network 10. Alternately, the NICs 12 can be coupled directly to the public ATM switch 16. As shown in FIG. 3, the computer system network 10 may also include computer systems which incorporate the use of a Local Area Network ("LAN") emulation 15 which serves as a gateway for connecting other networks such as Ethernet or token ring networks which utilize the ATM network as a supporting framework.

Figure 4:
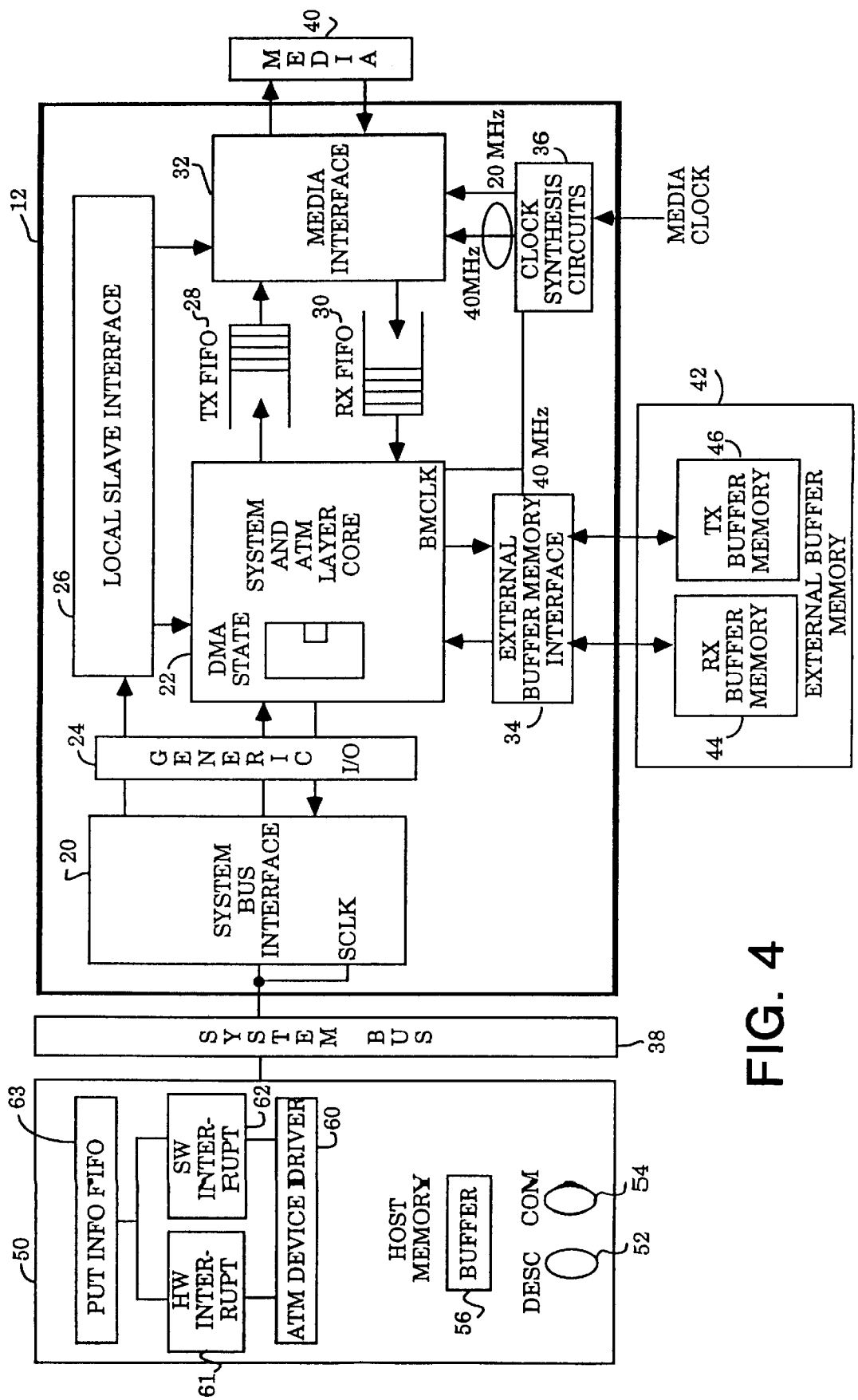
FIG. 4 is a simplified system diagram illustrating the architecture of the ATM network interface circuit (NIC) of FIG. 3.

FIG. 4 is a simplified system diagram illustrating the architecture of the ATM NIC 12 of FIG. 3. The ATM NIC 12 interfaces the host computer system to the network media 40 operating in accordance with the ATM protocol. The host computer system is coupled to the network media 40 through system bus 38.

The ATM NIC 12 shown includes a System Bus interface 20, a Generic Input/Output ("GIO") interface 24, a System and ATM Layer Core 22, a Local Slave interface 26, an array of transmit (TX) FIFOS 28, an array of receive (RX) FIFOS 30, a Media interface 32, an External Buffer Memory Interface 34 and a Clock Synthesis Circuit 36.

Together, the elements 20–36 of the network interface circuit 12 cooperate to asynchronously transfer data between the host computer and the other computers in the network through multiple, dynamically allocated channels in multiple bandwidth groups. Collectively, the elements of the network interface circuit 12 function as a multi-channel intelligent direct memory access (DMA) controller coupled to the System Bus 38 of the host computer system. In a preferred embodiment, multiple transmit and receive channels are serviced as virtual connections utilizing a full duplex 155/622 Mbps physical link. Multiple packets of data, subscribed to different channels over the System Bus 38 to the external buffer memory 42, via the External Buffer Memory Interface 34, are segmented by the System and ATM Layer Core 22 into transmit data for transmission to the Media 40 through Media interface 32.

The external buffer memory 42 has RX buffer memory 44 containing RX data buffers. The RX data buffers are primarily used for buffering incoming data. In an exemplary embodiment, part of the buffer memory is also used to hold information for 1024 receive channels out of which 128 are cached internal to the NIC 12. The data buffer memory is organized as a collection of forty-eight byte memory areas. Each forty-eight byte memory area holds the payload of an ATM data cell. A cell refers to forty-eight byte data and is well known in the art. The data buffer memory is a shared memory pool whose forty-eight byte memory area will be assigned dynamically to the incoming data for different channels. The dynamic forty-eight byte memory area allocation assigns free forty-eight byte memory area to the channels according to their needs and memory is fully utilized. In the extreme case, one channel can occupy all forty-eight byte memory areas in the memory pool or forty-eight byte memory areas may be assigned to many channels with close to perfect interleave data.

The ATM Layer Core 22 also comprises reassembly logic to facilitate reassembly of the receive packets. The TX and RX FIFOS 28, 30, coupled between the ATM Layer Core 22 and the Media Interface 32, are used to stage the transmit (TX) and receive (RX) data payloads of the transmit (TX) and receive (RX) packets respectively. The Media Interface 32 transmits and receives data to and from the Media 40 of the network, driven by clock signals provided by the Clock Synthesis Circuit 36. Preferably the Media 40, and therefore the Media interface 32, conforms to the Universal Test and Operations Physical Interface for ATM ("UTOPIA") standard, as provided by the ATM Forum UTOPIA Specification Level One, Version 2.01, Reference Number AF-PHY-0017.000, issued Mar. 21, 1994. To conform to the UTOPIA Specification, the Clock Synthesis Circuit 36 provides either a clock signal of 20 MHz or 40 MHz to enable the Media interface 32 to support a byte data stream at 20 MHz for 155 Mbps or a 16 bit data stream at 40 MHz for a 622 Mbps data stream.

In the presently preferred embodiment, the Media Interface 32 receives 52-byte data each having a 4-byte data header and a 48-byte payload from the TX FIFO 28. The Media Interface 32 inserts a checksum as a fifth byte to the data header into each data prior to providing the 53-byte data to the Media 40. Conversely, when the Media Interface 32 receives data from the Media 40, it examines the checksum in the fifth byte of each data to determine if the checksum is correct. If so, the byte representing the checksum is stripped from the data and the data is forwarded to the RX FIFO 30. Otherwise, the entire data is dropped.

The network interface circuit 12 also shields the data delineation details of asynchronous transfer from the applications running on the host computer system. For present purposes, it is assumed that applications running on the host computer system manage transmit and receive data using wrap around transmit and receive rings with packet interfaces. However, the present invention may be practiced with the applications running on the host computer system managing transmit and receive data using other data structures.

The System Bus Interface 20 and the Generic I/O interface 24 insulate the host computer system from the specifics of the transfer to the Media 40. Furthermore, the ATM Layer Core 22 is insulated from the specifics of the System Bus 38 and host data structure. In the present preferred embodiment, the System Bus 38 is an SBus, as specified in the Institute of Electronics and Electrical Engineers ("IEEE") standard 1496 specification. The System Bus Interface 20 is configured to communicate in accordance with the specifications of the system bus, in the present invention, the S-Bus.

The System Bus Interface 20 can be configured to conform to different host computer system buses. The System Bus Interface 20 is also configured to transfer and receive data in accordance with the protocols specified by the Generic I/O interface 24. The Generic I/O interface 24 provides a singular interface through which the ATM Layer Core 22 communicates with the host computer. Thus, the ATM Layer Core 22 does not change for different embodiments of the NIC 12 which interface to different host computer systems and buses.

The host memory 50 is coupled to the system bus 38. The descriptor ring 52 and the completion ring 54 are both in the host memory 50. Data may be direct memory accessed from the host memory 50 to the network interface circuit 12. When the network interface circuit 12 begins receiving packets through the media 40, a packet is transmitted through the media interface 32, through the ATM Layer Core 22 and into the external buffer memory 42. The packet is then transmitted back into the network interface circuit 12 through the ATM Layer Core 22 into the host memory 50. The network interface circuit 12 acknowledges the received packet and reads from the descriptor ring 52. Once the network interface circuit 12 has the DMA state, it begins to move the data packet into the buffer 56 and places the DMA state back on the completion ring 54.

The host memory 50 also contains the ATM device driver 60 with a hardware interrupt 61 for interrupting the process flow of the computer system upon packet arrival through the ATM NIC 12 and a software interrupt 62 to which process control is transferred for forwarding of the packet to the appropriate data stream. In one embodiment, the software interrupt 62 and the hardware interrupt 61 are codes configured for storage on a computer-readable apparatus and executable by a computer. Both the hardware interrupt 61 and the software interrupt 62 have access to a put information first-in first-out (FIFO) queue 63 containing put information entries associated with the packet.

Figure 5:
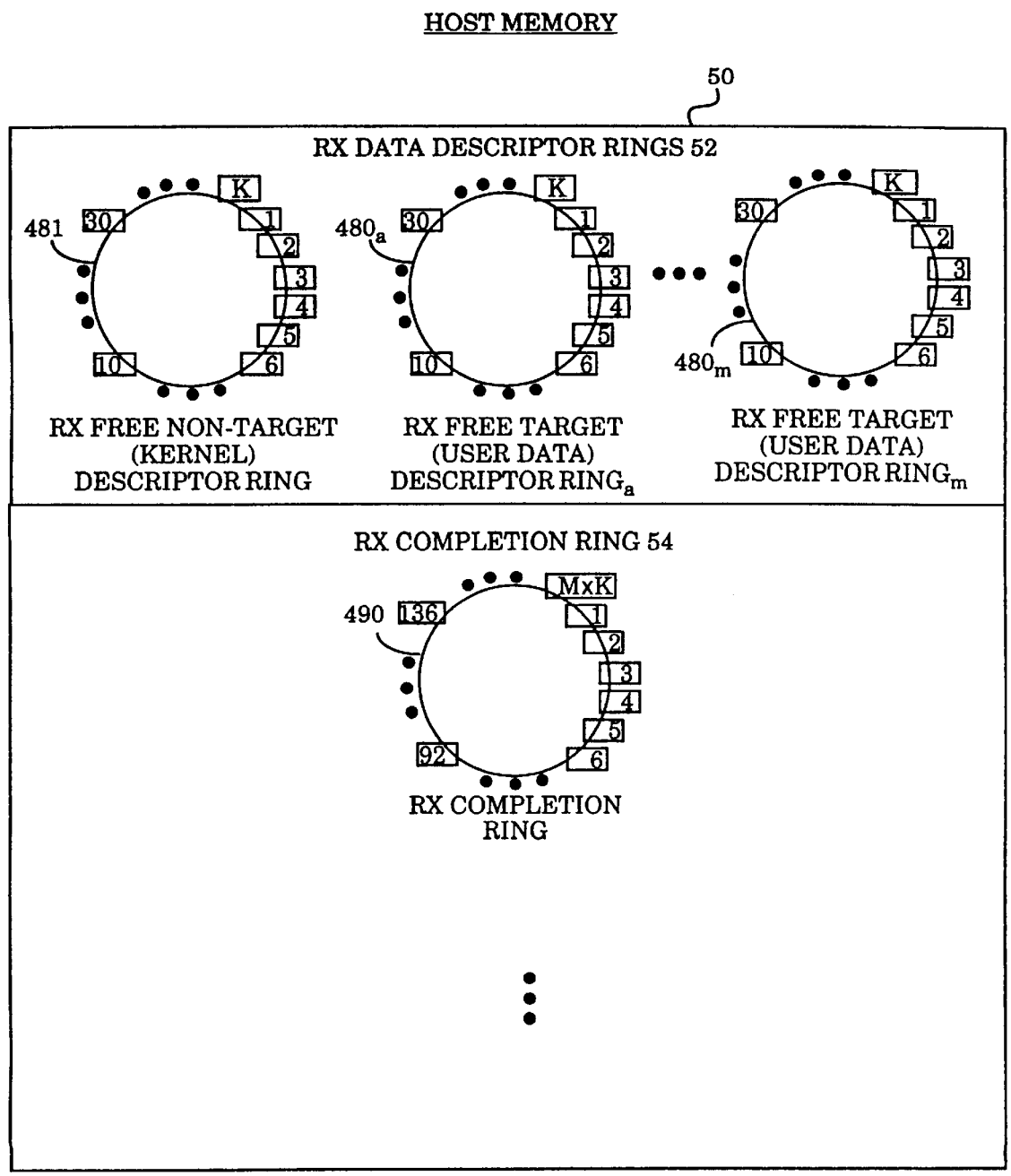
FIG. 5 is a general overview of the preferred data structure of the host memory used for data reception.

FIG. 5 is a general overview of the preferred data structure of the host memory used for data reception. The host memory 50 includes receive ("RX") free target (user data) data descriptor rings 480a–480m, an RX free non-target (kernel) descriptor ring 481 and an RX completion ring 490.

The RX free target (user data) data descriptor rings 480a–480m and the RX free non-target (kernel) descriptor ring 481 are two different types of RX free buffer descriptor rings. Each VC (virtual circuit) subscribes to one of the two types. The first type is a common free buffer pool which could be utilized by multiple VC's. The second type provides a dedicated free buffer pool for each VC. Further, the second type provides a private pool of buffers mapped directly to the user address space. The two different types of buffers provides both fast access to buffers through the free target buffer descriptor rings and memory saving common pool of buffers through the free non-target buffer descriptor rings. The VC subscribing to the common free buffer pool is referred to as a non-targeted VC and the dedicated free buffer pool is known as a targeted VC. Targeted VC's have buffer chaining privilege where the non-targeted VC's do not.

The RX free target (user data) data descriptor rings 480a–480m are data structures corresponding in number to the multiple channels, usually of different transfer data rates, supported by the network interface circuit (NIC) and to the RX data buffers. Each RX free data descriptor ring 480a–480m includes a plurality "K" of ring entries 485, numbered "1" to "K", which are accessed by software sequentially and in a circular fashion. In one embodiment, the value of "K" is a whole number preferably at least equal to sixty-four. Each ring entry is of a sufficient size (e.g., 64 bytes) to provide storage for a "data descriptor" which includes at least one pointer to a location in its respective RX data buffer where an associated data packet is located. Thus each receive channel programmed as a target channel would have its own free buffer descriptor ring. In one embodiment, there will be up to 1,024 free buffer rings for up to 1,024 target connections. When a particular channel runs out of free buffer and a packet arrives, the hardware will access the common free buffer pool to retrieve a free buffer. The RX free target data descriptor ring uses "OWN" bit for descriptor ownership.

There is one common RX free data descriptor ring 481 primarily to store packets for multiple receive channels which have been programmed as non-target channels. Non-target channels are normally utilized for packets destined to kernel space such as the NFS (network file system). The RX free non-target descriptor ring 481 may also be utilized as a back-up buffer pool when the individual target channels (channels which are tied directly to user application) run out of free buffers. In an exemplary embodiment, there are two buffer pointer entries per descriptor. One buffer pointer stores the protocol header and the other stores the data portion of the packet. In one embodiment, the header buffers and data buffers are 2048 bytes and 64k bytes respectively. The RX free non-target data ring 481 utilizes an "OWN" bit for descriptor ownership.

The RX completion ring 490 is a data structure having a plurality of ring entries which contains all information to process a packet (e.g. status information, buffer pointer information) in each ring entry rather than relying on pointers. The received data packets for multiple channels are reported in a single RX completion ring 490 both for targeted and non-targeted VC's. In one embodiment, the RX completion ring 490 occupies 64k bytes of host memory 50 through 1,024 ring entries being on 64 byte boundaries. The RX completion ring 490 is accessible by both software and hardware requiring an OWN bit in each descriptor which is set when the NIC 12 has ownership of the RX completion ring 490.

Figure 6:
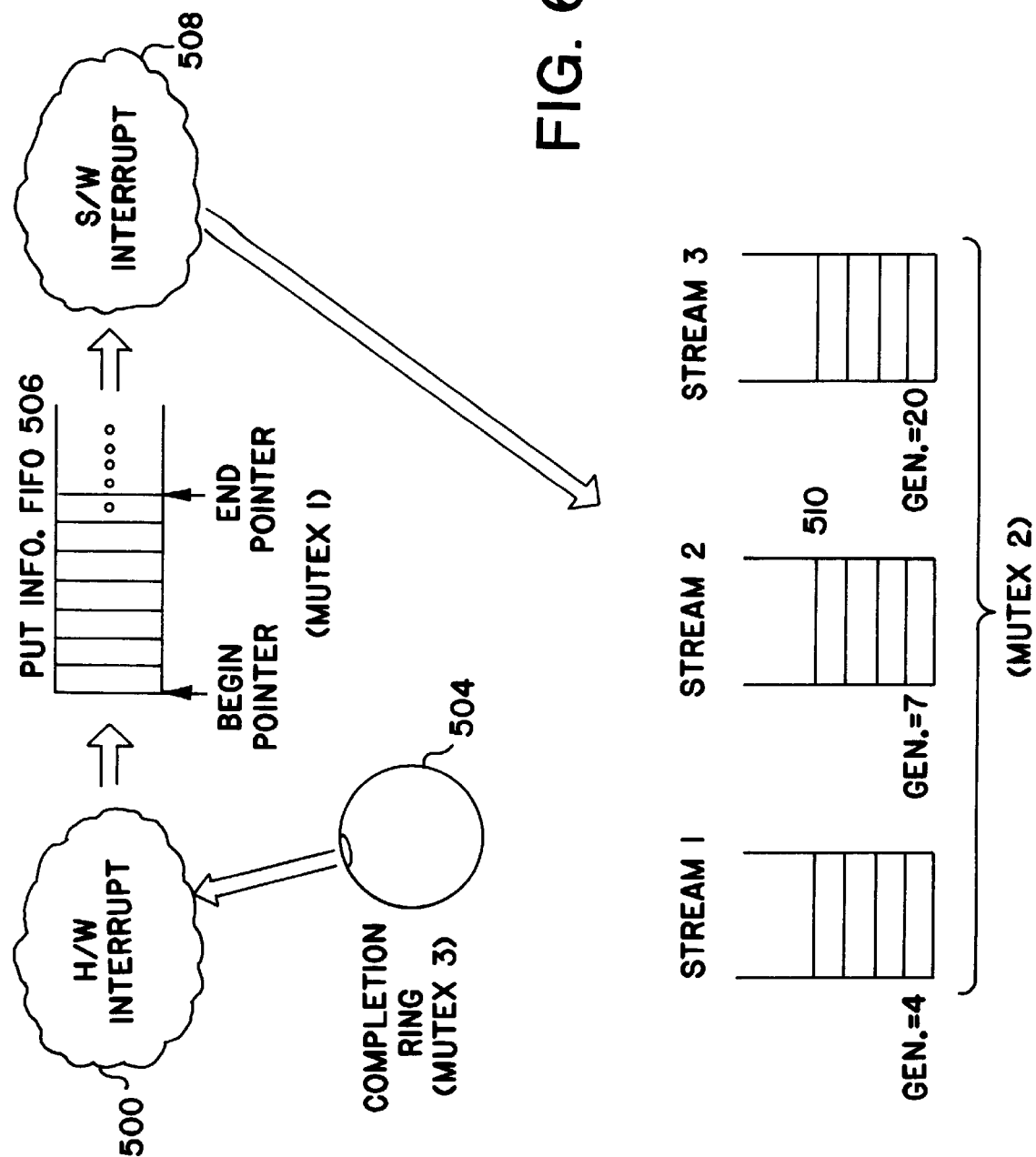
FIG. 6 illustrates an exemplary embodiment of the present invention's mechanism for reducing interrupt overhead in device drivers.

FIG. 6 illustrates an exemplary embodiment of the present invention's mechanism for reducing interrupt overhead in device drivers.

In the present invention, network device driver tasks tending to monopolize central processing unit (CPU) time are performed at an interrupt level which allows higher level interrupts of other device drivers normally preempted by a network device driver interrupt to be serviced by the CPU more often. More specifically, a software interrupt being processed by the CPU at a lower interrupt level than a high level hardware interrupt normally associated with a network device driver is triggered responsive to the high level hardware interrupt asserted by an ATM device.

In preparation of a packet arrival, a user process opens data streams capable of processing data packets. An ATM device driver assigns a unique generation number to each data stream generated. Once a packet is received at the ATM device, the ATM device causes a hardware interrupt 500 associated with the ATM device driver. The hardware interrupt 500 gains the process control and enters a mutual exclusion (mutex) 3 to gain exclusive access to the completion ring 504 to retrieve a buffer from buffers 56 to temporarily store the packet.

Mutex 1, 2 and 3 are routines ensuring that at any given time, only one asynchronous procedure may access the same shared variable or execute members of a group of critical sections. Mutex refers to a concept of mutual exclusion. As used herein, it refers to a routine which only allows one software application to access and use a component associated with a given mutex at any one time. There is also a routine which automatically enters a mutex to allow an application to acquire a mutex lock. The mutex lock keeps different threads from choosing the same location in the locked process.

Upon entering a mutex 3, the hardware interrupt 500 also compiles a put information for the packet to be later referenced by the software interrupt 508 and stores the information in a put information FIFO queue 506. In one embodiment of the present invention, the put information FIFO queue 506 may be an array of put information entries with a beginning and an end pointer indicating the beginning and the end of the queue.

The hardware interrupt 500 exits mutex 3. The process control is then transferred from the hardware interrupt 500 to the software interrupt 508. During this interval, the data stream to which the packet is destined may be accessed by other applications or processors (especially in a multiprocessing environment) such that the data stream is altered and the data stream is no longer applicable for the packet. To avoid sending a packet to a changed data stream, the hardware interrupt 500 saves the unique generation number previously assigned to each data stream generated which allows the software interrupt 508 to monitor for changes in each data stream. The unique generation number for each data stream is saved in the put information for the associated packet for use by the software interrupt 508. Each put information for each packet is stored in the put information FIFO queue 506.

The software interrupt 508 enters a mutex 1 to exclusively access the put information FIFO queue 506 and a mutex 2 to exclusively access the data stream 510. The software interrupt 508 then retrieves the put information from the put information FIFO queue 506 and compares the generation number associated with the packet with the generation number of the data stream to which the packet is destined. If the generation numbers are equal, the data stream is determined to be unchanged and the packet is sent to the data stream 510 for processing. Otherwise, the data stream 510 is assumed to be changed and the packet cannot be processed. Accordingly, the packet is given up and the associated memory space is made available for use.

Figure 7:
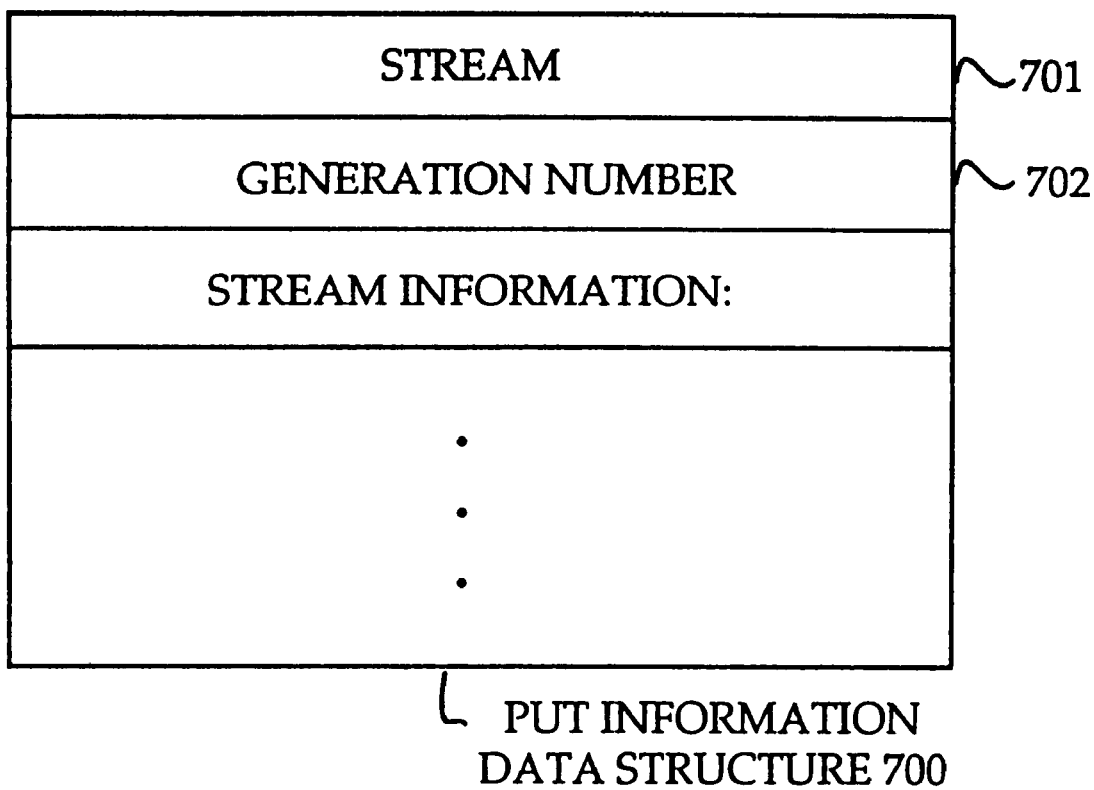
FIG. 7 illustrates an exemplary put information data structure.

FIG. 7 illustrates an exemplary put information data structure 700. The put information data structure 700 has various packet information stored in it including a data stream identification 701 and a unique generation number 702. The data stream identification 701 identifies the data stream 510 to which the packet is destined. The unique generation number 702, unique to the data stream generated for the packet, is used to identify whether the data stream has been changed prior to transmission of the packet to the data stream.

Figure 8A:
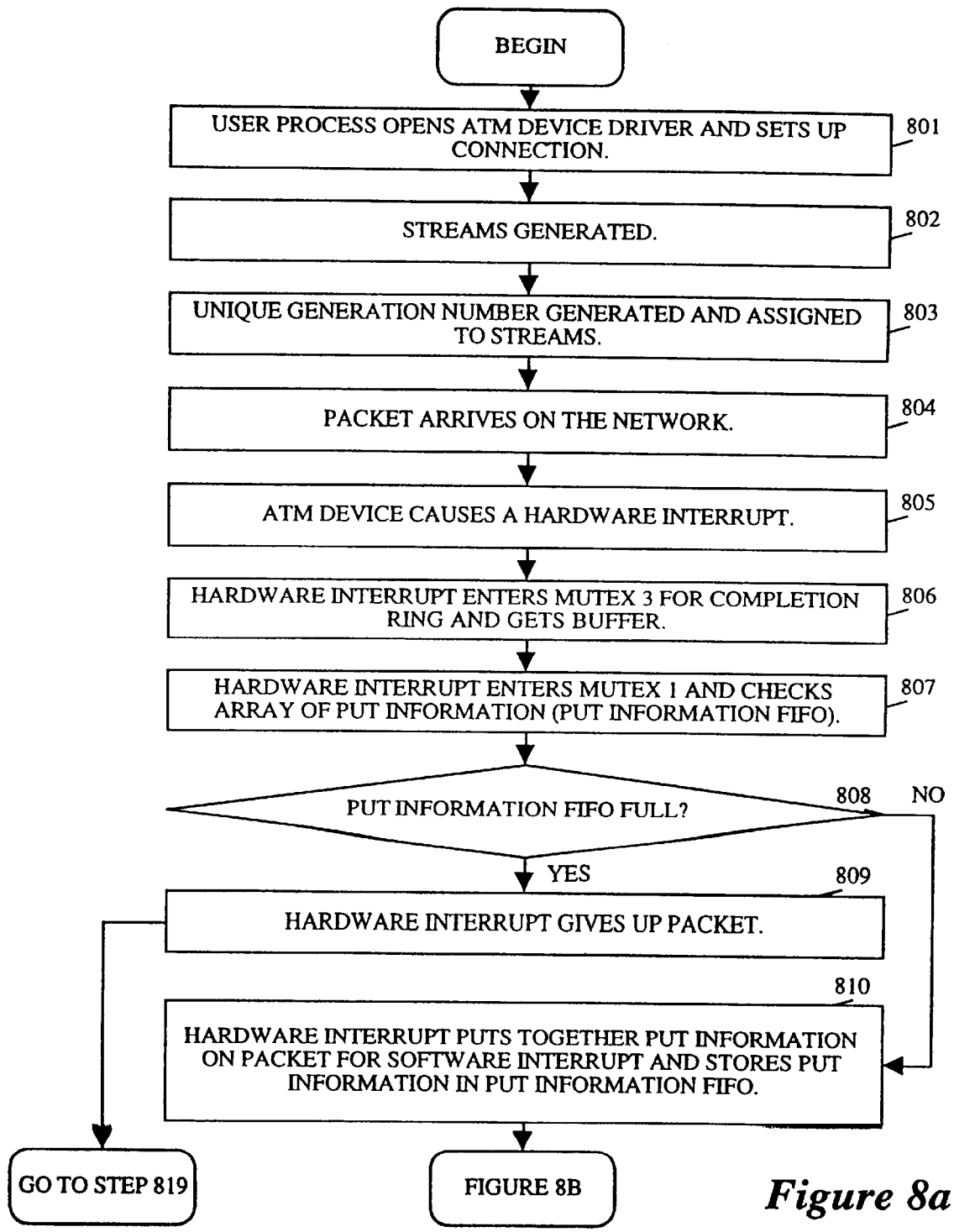
FIGS. 8a and 8b illustrate the general steps followed by the present invention.
Figure 8B:
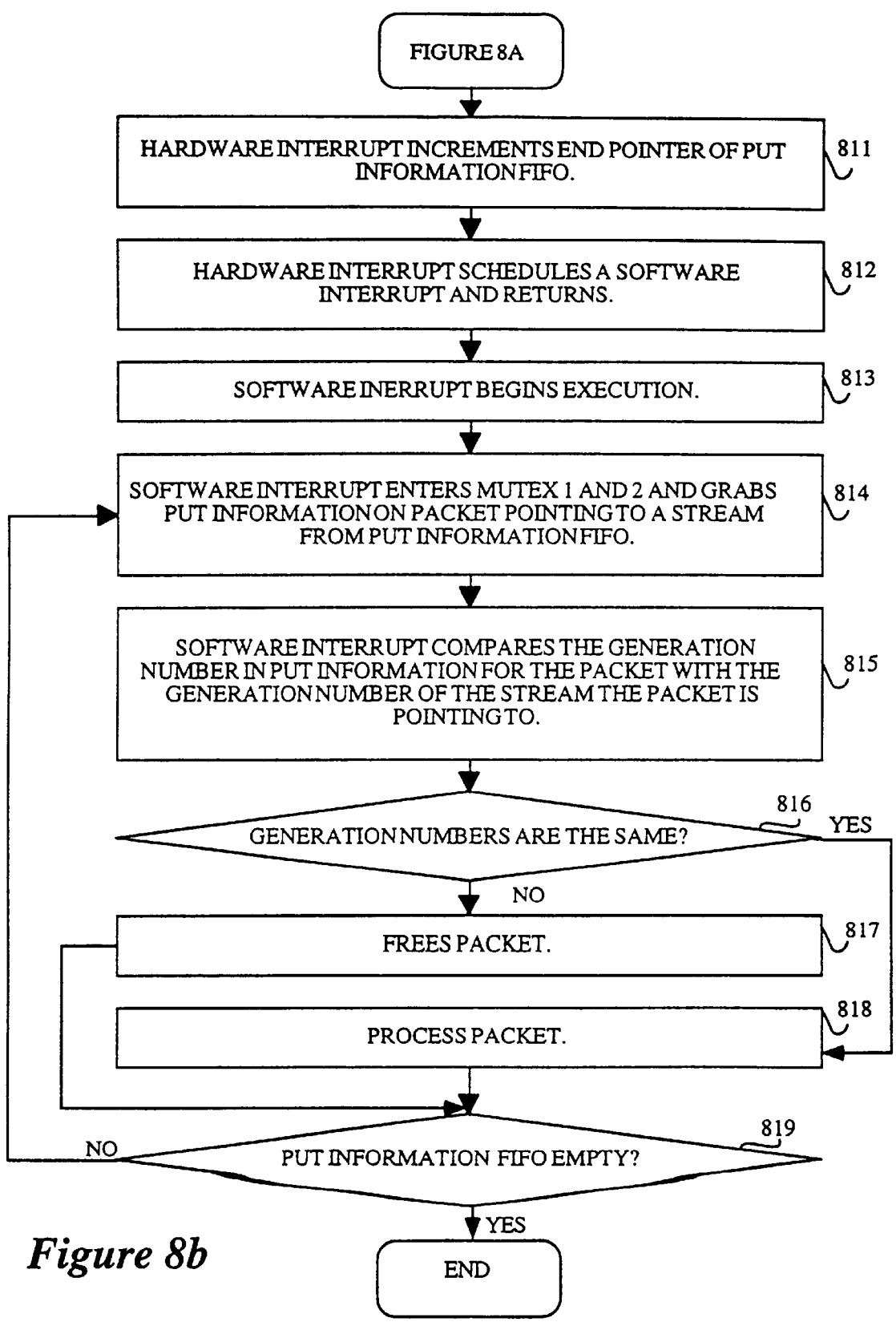

FIGS. 8*a* and 8*b* illustrate the general steps followed by the present invention's method and apparatus for reducing interrupt overhead in device drivers. In step 801, a user process opens an ATM device driver 60 through a standard open routine to set up a connection with an ATM device. In step 802, data streams are generated to process one or more packets forwarded between one or more user processes and the ATM device. In step 803, unique generation numbers are assigned to each data stream generated for a given packet. More specifically, a global generation number which is the highest generation number assigned to a data stream thus far is incremented. The incremented global generation number is assigned to the next new data stream.

In step 804, a packet arrives on the network from the ATM device. In step 805, the arrival of the packet on the network causes a hardware interrupt associated with the ATM device driver 60. In step 806, the activated hardware interrupt enters mutex 3 to gain exclusive access to the completion ring 54 pointing to a plurality of buffers and receives an available buffer through the completion ring 54.

In step 807, the hardware interrupt utilizes previously entered mutex 3 to gain exclusive access to the put information FIFO queue 63 and to the queue's begin pointer and checks the put information FIFO queue 63 for available space. In step 808, if the put information FIFO queue 63 is full, then in step 809, the hardware interrupt gives up the packet and the process is terminated. Otherwise if the put information FIFO queue 63 has space available for a new put information entry, then in step 810 the hardware interrupt compiles a put information for the newly arrived packet and inserts the put information into the put information FIFO queue 63. In step 811, the hardware interrupt increments the end pointer pointing to the end of the put information FIFO queue 63 to reflect the addition of the new put information entry to the put information FIFO queue 63. In step 812, the hardware interrupt schedules a software interrupt and returns.

In step 813, the software interrupt begins execution. In step 814, the software interrupt enters mutex 1 to gain exclusive access to the put information FIFO queue 63 and to the queue's end pointer and mutex 2 to gain exclusive access to the data streams. The software interrupt then accesses the packet's put information from the put information FIFO queue 63. In step 815, the software interrupt compares the generation number in the put information for the packet against the generation number of the data stream the packet is destined to. In step 816, if the generation numbers are the same, the data stream is assumed to be unchanged and the packet is processed in step 818. Otherwise in step 817, the data stream is assumed to be changed and no longer applicable to the packet. The packet is therefore given up and the associated memory space is made available for use.

In step 819, if there are more put information entries in put information FIFO queue 63, then the process is returned to step 814. The software interrupt begins the process of entering mutex 1, 2 and the put information on the packet for processing. Otherwise, if the put information FIFO queue 63 is empty, the software interrupt determines that there are no more packets associated with the ATM device to be processed and the process is complete.

What has been described is a mechanism for reducing interrupt overhead in device drivers. A network device such as an ATM device with a high level interrupt begins processing and transfers process control to a lower level software interrupt. The lower level software interrupt utilizes CPU resources as it is given to complete the packet processing. Prior to the transfer of process control, the hardware interrupt generates a put information for the packet which is then retrieved and utilized by the software interrupt to process the packet. A unique generation number is assigned to each data stream. The generation number associated with a given packet's put information is compared to the generation number of a data stream to which the packet is destined to. If the generation numbers are equal, it is assumed that the data stream to which the packet is destined to has not been changed and the packet is forwarded to the data stream for further processing.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for reducing interrupt overhead in device drivers comprising:

asserting a high level hardware interrupt in response to a packet arrival through a network device, said packet destined to one of a plurality of data streams;

assigning a generation number to said one of said plurality of data streams to which said packet is destined;

associating said generation number with said packet;

transferring process control from said high level hardware interrupt to a lower level software interrupt allowing other higher priority processes to execute;

comparing said generation number assigned to said one of said plurality of data streams with said generation number associated with said packet; and forwarding said packet to said one of said plurality of data streams if said generation numbers are equal.

2. The method of claim 1 wherein associating said generation number with said packet further comprises creating a put information for said packet containing data stream identification identifying said one of said plurality of data streams to which said packet is destined and said generation number.

3. The method of claim 2 further comprising inserting said put information into a put information first-in first-out (FIFO) queue if said put information FIFO queue contains available space for said put information.

4. The method of claim 3 further comprising incrementing a global generation number to reflect the insertion of said put information into said put information FIFO queue.

5. The method of claim 4 further comprising retrieving said put information on said packet from said put information FIFO queue.

6. The method of claim 1 further comprising labeling said one of said plurality of data streams with said generation number corresponding to when said one of said plurality of data streams was generated and which is unique to said one of said plurality of data streams.

7. An apparatus comprising:

a high level hardware interrupt module asserted by a network device and configured to request a central processing unit (CPU) to support packet input/output associated with said network device and to interrupt process flow to process transmission of a packet from said network device, a generation number being assigned to a data stream to which said packet is destined, said generation number being associated with said packet; and a low level software interrupt module configured to take over process control from said high level hardware interrupt module allowing other higher priority processes to execute, said software interrupt module comparing said generation number assigned to said data stream with said generation number associated with said packet, forwarding said packet to its destination if said generation numbers are equal, said low level software interrupt module coupled to said high level hardware interrupt module.

8. The apparatus of claim 7 further comprising a plurality of data streams being said destination and for processing said packet received through said network device, each said plurality of data streams assigned a unique generation number, one of said plurality of data streams assigned said generation number.

9. The apparatus of claim 8 further comprising a put information first-in first-out (FIFO) queue which contains a pointer to one of said plurality of data streams and said generation number assigned to said one of a plurality of data streams thereby associating said generation number with said packet.

10. The apparatus of claim 9 wherein said put information FIFO queue is an array of put information entries for a given packet.

11. The apparatus of claim 10 wherein said high level hardware interrupt module creates a put information for said packet and inserts said put information into said put information FIFO queue if said put information FIFO queue has available space.

12. The apparatus of claim 11 wherein said low level software interrupt module retrieves said put information associated with said packet from said put information FIFO queue.

13. A system comprising:

an asynchronous transfer method (ATM) interface circuit having, a host memory which contains, a high level hardware interrupt module asserted by a network device and configured to request a central processing unit (CPU) to support packet input/output associated with said network device and interrupting process flow to process transmission of a packet from said network device, a generation number being assigned to a data stream to which said packet is destined, said generation number being associated with said packet, and a low level software interrupt module configured to take over process control from said high level hardware interrupt module allowing other higher priority processes to execute, said software interrupt module comparing said generation number assigned to said data stream with said generation number associated with said packet, forwarding said packet to its destination if said generation numbers are equal, said low level software interrupt module coupled to said high level hardware interrupt module; and said CPU for executing said high level hardware interrupt module and said low level software interrupt module.

14. The system of claim 13 further comprising a plurality of data streams being said destination and for processing said packet received through said network device, each said plurality of data streams assigned a unique generation number, one of said plurality of data streams assigned said generation number.

15. The system of claim 14 further comprising a put information first-in first-out (FIFO) queue which contains a pointer to one of said plurality of data streams and said generation number assigned to said one of a plurality of data streams thereby associating said generation number with said packet.

16. The system of claim 15 wherein said put information FIFO queue is an array of put information entries for a given packet.

17. The system of claim 16 wherein said high level hardware interrupt module creates a put information for said packet and inserts said put information into said put information FIFO queue if said put information FIFO queue has available space.

18. The system of claim 17 wherein said low level software interrupt module retrieves said put information associated with said packet from said put information FIFO queue.

* * * * *